US012591754B2

(12) United States Patent
Resnick et al.

(10) Patent No.: US 12,591,754 B2
(45) Date of Patent: Mar. 31, 2026

(54) SMART CONNECTED FILM AND PLATFORM

(71) Applicant: Quadratic Technologies, LLC, Cleveland, OH (US)

(72) Inventors: Steven Resnick, Cleveland Heights, OH (US); Robert James Pietila, Burlingame, CA (US); Zachariah S. Simmering, Mansfield, OH (US)

(73) Assignee: Quadratic Technologies, LLC, Cleveland, OH (US)

( * ) Notice: Subject to any disclaimer, the term of this patent is extended or adjusted under 35 U.S.C. 154(b) by 0 days.

(21) Appl. No.: 19/011,981

(22) Filed: Jan. 7, 2025

(65) Prior Publication Data

US 2025/0299002 A1    Sep. 25, 2025

Related U.S. Application Data

(63) Continuation of application No. 18/961,228, filed on Nov. 26, 2024.

(60) Provisional application No. 63/568,763, filed on Mar. 22, 2024.

(51) Int. Cl.
*G06K 7/10* (2006.01)
*G06K 7/14* (2006.01)

(52) U.S. Cl.
CPC ....... *G06K 7/10722* (2013.01); *G06K 7/1417* (2013.01)

(58) Field of Classification Search
CPC .......................... G06K 7/10722; G06K 7/1417
See application file for complete search history.

(56) References Cited

U.S. PATENT DOCUMENTS

| | | | | |
|---|---|---|---|---|
| 8,413,882 B1* | 4/2013 | Nidamarthi | ............ | G06Q 30/00 |
| | | | | 235/383 |
| 2011/0027520 A1* | 2/2011 | Lauterbach | ........... | E04F 15/185 |
| | | | | 428/221 |
| 2011/0185607 A1* | 8/2011 | Forster | .................... | G09F 15/02 |
| | | | | 340/10.5 |
| 2015/0066296 A1* | 3/2015 | Trombley | .............. | B62D 13/06 |
| | | | | 701/41 |
| 2023/0306213 A1* | 9/2023 | Hester | .............. | G06K 19/07773 |

OTHER PUBLICATIONS

N. T. B. Pasaribu, M. Tanubrata, V. Arisandhy, E. M. Sartika and A. Gany, "Application of Projection Mapping and RFID in Assembly Process," 2024 2nd International Conference on Technology Innovation and Its Applications (ICTIIA), Medan, Indonesia, 2024, pp. 1-6 (Year: 2024).*

* cited by examiner

*Primary Examiner* — Matthew Mikels
(74) *Attorney, Agent, or Firm* — Renner, Otto, Boisselle & Sklar, LLP

(57) ABSTRACT

A smart graphics panel system includes a plurality of graphics panels. Each of the graphics panels includes an outer graphical image, an inner substrate that affixes the graphics panel to a surface, a concealed device embedded in the substrate. The concealed device has a memory containing information relating to the graphics panel, software that prepares and writes the information to the concealed device. The system includes a scanner that communicates with the concealed device to retrieve the information.

10 Claims, 3 Drawing Sheets

SMART CONNECTED FILM AND PLATFORM

BACKGROUND OF THE INVENTION

An issue exists in the printing, kitting, shipping, and installation of large scale printed graphics. The predominate form of the printed material is a rolled product, but the application can be applied to any product, either rolled, pliable or hard surface. The initial use case is for printed graphics.

The existing process is to have the graphic files produced, which are then used to print the graphic on a rolled vinyl film. Once the graphics are printed and processed, they are stacked in the print shop, rolled up and labeled with a sticky note denoting the location for installation. The completed rolled up graphics are placed in a shipping box which is labeled with the contents and the installation location. The boxes are shipped to the job site for installation, where an installation crew is waiting to unbox, sort, and install the printed vinyl graphics. In a perfect scenario, all of this goes smoothly but that is not the outcome in many instances. A graphic panel may be missing, either it was not printed, not shipped, or not placed in the correct box. Trying to locate the missing panel takes time and costs money, which can impact the installation schedule.

Historical cost data show that the cost of an error can range between 15% to over 500% of the item/project cost. Depending on the error, it is not uncommon for the repair remediation to exceed the original total project cost.

A completed set of graphics can consist of many panels, which are sequenced, have a top, bottom, left and right side, and can be installed on large objects where keeping the film level during installation is a challenge. The result of searching for a missing or misplaced panel impacts the installation schedule and cost. The proposed solution can potentially reduce installation time by 40%, which carries significant cost savings on large projects. In addition, installers may refuse to install if any of the parts or sections are missing and will charge for overtime and returning to a job site causing significant cost overruns.

BRIEF SUMMARY OF THE INVENTION

The invention relates to a smart platform that is a connected platform that streamlines workflow and installation of customized physical products, minimizing or eliminating errors. The system utilizes an embedded device, such as a QR code, RFID tag, or an NFC chip, which is applied to a product at the start of manufacturing. The product data flows along with the part.

An exemplary smart graphics panel system includes a plurality of graphics panels, each graphics panel comprising an outer graphical image, an inner substrate that affixes the graphics panel to a surface, an applied or integrated device embedded in the substrate, the device having a memory containing information relating to the graphics panel, software that prepares and writes the information to the applied or integrated device, and a scanner that communicates with the device to retrieve the information.

An exemplary smart panel system includes a plurality of panels, each panel comprising an outer surface, an inner substrate that affixes the panel to a surface, an embedded device disposed in the substrate, the device having a memory containing information relating to the panel, software that prepares and writes the information to the embedded device, and a scanner that communicates with the embedded device to retrieve the information.

The smart graphics panel system can include wherein the surface is an outer surface of an automobile, a bus, a train car, a recreational vehicle (RV), a truck, a trailer, and combinations thereof.

The smart graphics panel system can include wherein information relating to the graphics panel comprises an art file name, a digital image file of the graphical image, a count of a total number of panels in a series, a serial number of the panel, a position indicator of the panel in a composite image, a shipping address, a location where the product is to be installed, an orientation direction, and combinations thereof.

The smart graphics panel system can include wherein the scanner imposes, via augmented reality, virtual reality, or combination of both, an install diagram onto the surface, shows a user which panel is a first step in an installation process, shows an order of installation, provides feedback when alignment of panels is achieved, memorializes when a liner paper is removed from a panel, informs the user which panel is in which received box, compares contents of received boxes to a project to be done and notifies the user whether all the panels are present, informs the user what panels are remaining to be delivered, informs the user what panels are remaining to be installed, shows the user what panels goes into which box, and combinations thereof.

The smart graphics panel system can include wherein the software holds information about the graphic panel, instructs and directs the panel through a workflow lifecycle from factory, finishing, through packing, and installation at a final job site.

A exemplary smart panel system includes a plurality of panels, each panel comprising: an outer surface, an inner substrate that affixes the panel to a surface, an embedded device disposed in the substrate, the device having a memory containing information relating to the panel, software that prepares and writes the information to the embedded device, and a scanner that communicates with the embedded device to retrieve the information.

The smart panel system can include wherein the embedded device holds information about the panel, and is configured to instruct, via the scanner, the sequence of installing the plurality of panels.

The smart graphics panel system can include wherein information relating to the panel comprises a count of a total number of panels in a series, a serial number of the panel, a position indicator of the panel in a composite image, a shipping address, a location where the product is to be installed, an orientation direction, and combinations thereof.

The smart graphics panel system can include wherein the embedded device includes an internet link to an e-commerce platform.

The smart graphics panel system can include wherein the panel is selected from decking, floor tile, a floorboard, laminate floor covering, laminate wall covering, a wall board, fabric wall covering, a portion of a mural, and combinations thereof.

DETAILED DESCRIPTION OF THE INVENTION

Figure 1:
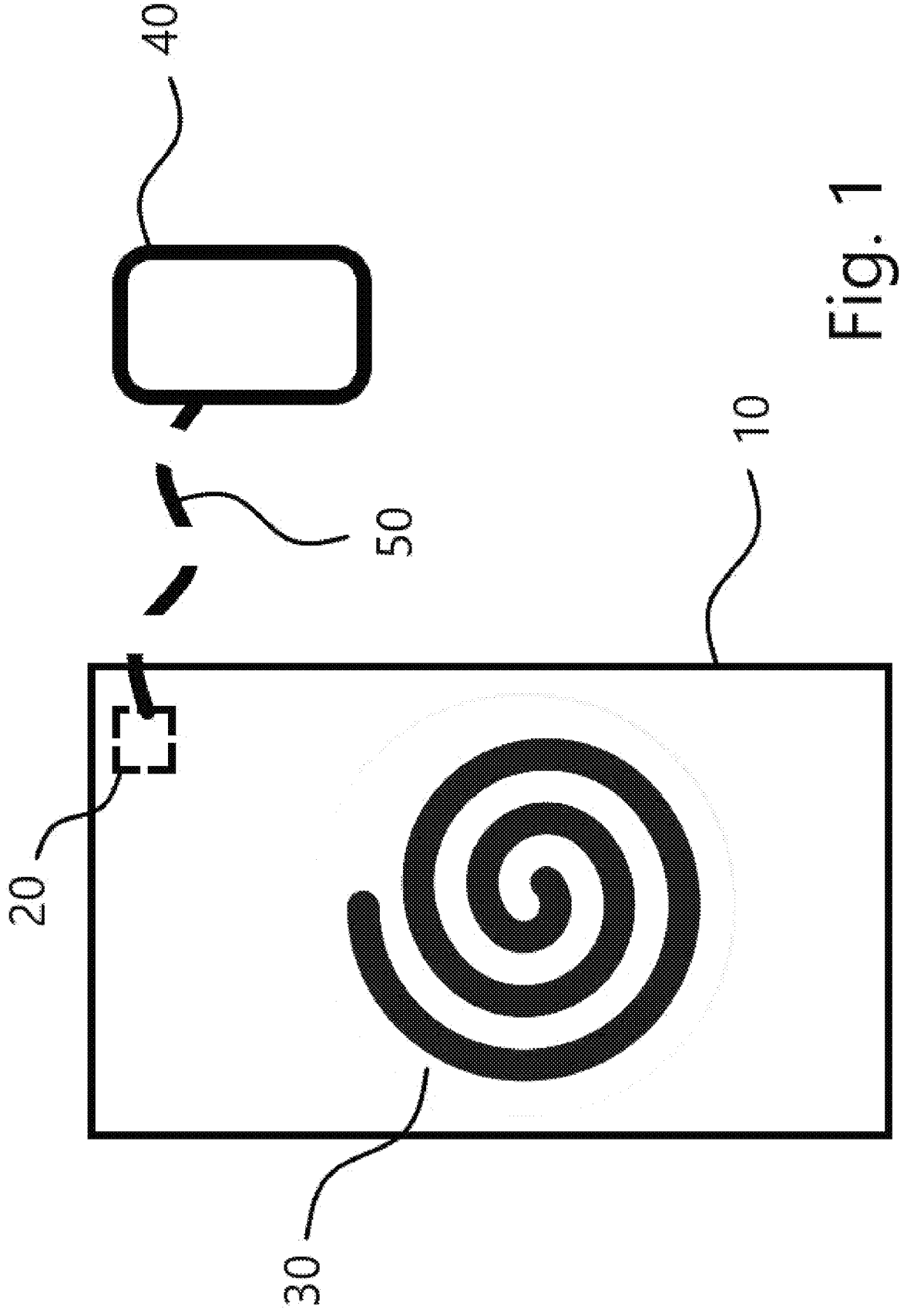
FIG. 1 shows an exemplary smart graphics panel system.

The Smart Connected Film and Platform is a smart graphics system that involves a product, functional benefits, digital technology, and a connected ecosystem which consists of an archival database. The system allows a user to create and follow a digital workflow for a product, such as a graphical panel or construction panel. The rolled or flat substrate has a type of embedded sensor or chip device that can have data written to it. The chip can be programmed during the printing process or post printing where the data is documented and stored locally or within a cloud-based architecture. The substrate has a graphical image on its outer surface and an adhesive on its inner surface, or other means to affix the substrate to a surface.

The chip (device) can be, but is not limited to, a Near-Field Communication chip (NFC chip or NFC chipset), or a RFID (radio frequency identification) chip, or RFID tag. Such chips are preferred since they do not require a power source connected to the chip. Other communication or data transfer means can include lidar, computer vision, QR codes (including Invisible and/or infrared QR codes). The applied device (sensor or chip) is affixed to or integrated into the substrate and is designed to where the chip is concealed and will minimally telegraph through the front of the panel.

When the substrate is printed or manufactured, information that is written on the chip or sensor can include, but is not limited to, an art file name, the location, and/or orientation of the product. Once the substrate is printed or processed, it is set aside to be kitted, packed, and shipped. Once the product is boxed, a user scans a box, or scans the panel though the surface of the box, using a handheld device or smartphone, whereby the chip or sensor lets the user know all the required panels are in the box.

When the boxes are shipped and arrive at the job site, a handheld device or smartphone tells the user, via the chip or sensor, the location where the product is to be installed, its orientation, and additional requirements. The product is then unpacked and laid out for installation, at which point, the product is placed in sequence with the correct orientation. During installation, the handheld device, by interacting with the chip or sensor, confirms that the panel is level and aligned. The handheld device can be either a smartphone, a tablet, or purpose-built device which is using an app that supports the functionality of the system.

The handheld device uses Apple Vision or similar software/app. The device/software imposes an install diagram onto the surfaces (building surfaces, vehicles) via augmented reality and/or virtual reality (AR/VR). The device/software (i.e. the chip, sensor, handheld, device, and software, alone or in combination) shows the user which part to start installing (i.e. first step in the installation process) and order of installation. The device/software provides feedback (e.g. a satisfying "click") when alignment of pieces is achieved. The device/software can record/memorialize when the liner paper is removed (time of install). The device/software can inform the user which piece/part is in which/each received box(es). The device/software can compare contents of received boxes to the actual project to be done on-hand to let the user know if all the parts/pieces are present. The device/software can inform the user what parts are remaining to be delivered, and what parts are remaining to be installed. In the factory the device/software can show the user what parts go into which box. The device/software can not only hold information about the graphic product itself, but also instruct and direct the part through the entire workflow lifecycle from factory, finishing, through packing, and actual installation at a final job site.

The components of the system include:

A continuous chip/sensor that is embedded or applied to the substrate during production.

Chip or sensor having sufficient capacity to securely hold the required production data.

Software that prepares the information to be written to a sensor or a chip.

Chip application equipment when necessary, such as equipment that applies or installs the NFC chip/RFID tag as printing/manufactured.

A physical device installed inside the production or printing equipment that writes the data to the chip.

Development or invisible codes that can be printed on any substrate (e.g. transparent, hidden, or "invisible" QR codes). This may include leveraging or adapting existing technologies in this field.

A device (e.g. a smart phone, an app, a specialized electronic device) that reads the information in the production facility, and in the field.

Implementation of Computer Vision systems to aid in the processing of product, installation, quality control and quality assurance in the production facility, on the jobsite, and post installation. The system includes technology that supports E-commerce offerings.

Markets and industries where technology and systems could be commercialized include transportation (automobiles, trains, buses, recreational vehicles, architectural finishes). Additional, adjacent markets can include: rolled and flat packed products; construction materials; including: glass windows; curtain walls; draperies; fabrics; cabinetry; wrapped panels; upholstered panels; wall coverings; building cladding; rain screens; architectural millwork; flooring; wood veneers; wooden, plywood, and MDF panels; panelized materials; decorative metals; outdoor residential cladding; knocked down furniture; industrial products, and any product that requires assembly, alignment and organization of parts.

Other adjacent markets can include those which share portions or most, or all of the following characteristics: 1. Custom products, 2. Products that have unique components, 3. Products produced, shipped, or delivered in large quantities, 4. Installation intensive products, 5. Products that have an emphasis on sequence, orientation, and staging location, 6. Products that can have a significant impact to schedule and cost if delivered late, not installed correctly, or damaged, 7. Products that require skilled labor required for production, staging and installation, 8. Products that have tags or identifying labels that can be missing or damaged.

As shown in FIG. 1, an exemplary graphics panel 10 has a graphical image 30 on its outer surface. A sensor or chip 20 is embedded in the interior of the panel 10 such that it is not visible, is minimally visible, and/or it does not deform, or minimally deforms, the surface of the panel (i.e. the chip 20 does not form or minimally forms a lump in the surface of the panel 10). A handheld device 40 can communicate wirelessly 50 with the chip 20. FIG. 19 is for illustration purposes and is not to scale.

Figure 2:
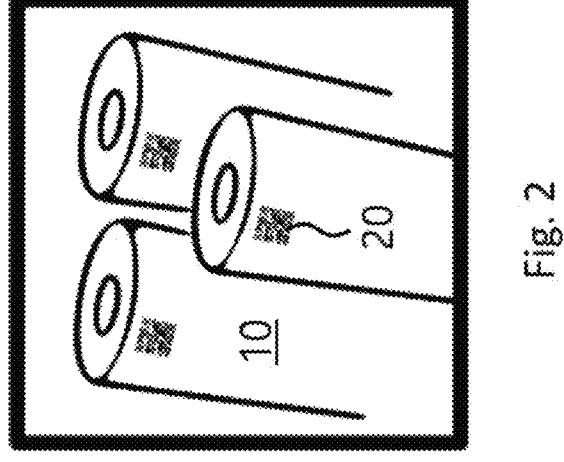
FIG. 2 shows rolled panels ready for shipping.

FIGS. 2-7 show an exemplary installation sequence of a panel. FIG. 2 shows an exemplary set of panels, in this case a set of rolled graphics panels 10. Each panel has a device 20 that stores the information. As shown in FIG. 2, the device is depicted as a QR code, but be a NFC chip, a RFID tag, or any other device set forth above.

Figure 3:
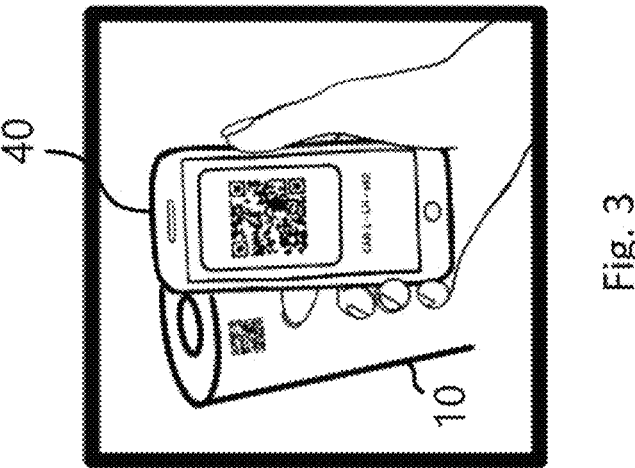
FIG. 3 shows a user writing data to the sensor.

As shown in FIG. 3, a user writes information data to the device 20 in or on the panel 10 using a handheld device 40. The data can include production, kitting, and installation information as set forth above. As shown in FIG. 3, the handheld device is shown as a smart phone, but is limited to a smart phone and can be any handheld device, including a specially designed device for writing to and/or scanning/reading from the device 20.

Figure 4:
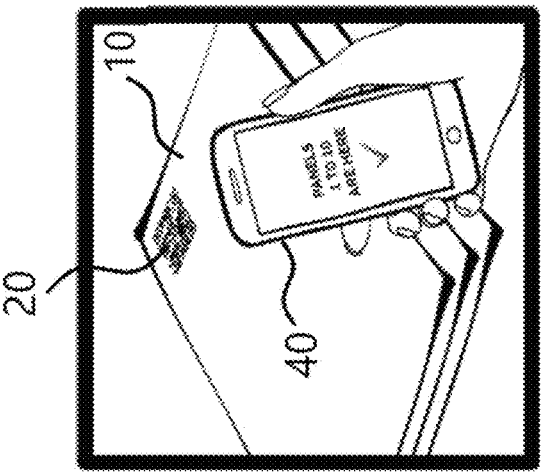
FIG. 4 shows a user confirming kit is complete.

As shown in FIG. 4, a user scans the device 20 in or on the panel 10 using a handheld device 40 to confirm that the kit is complete (i.e. all the panels are included). After scanning, the panel kit is shipped to the job site.

Figure 5:
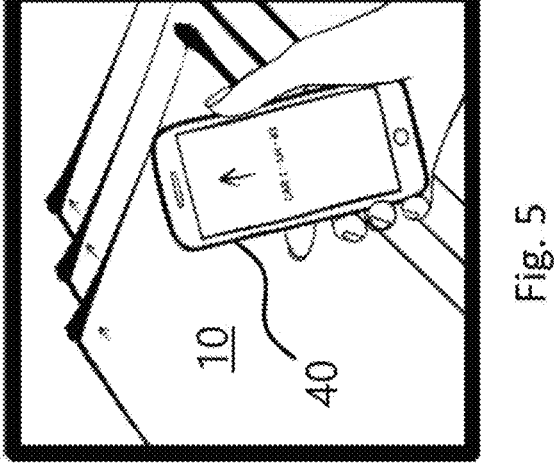
FIG. 5 shows a user verifying sequence and orientation of panels.

As shown in FIG. 5, the user confirms delivery by scanning the panel 10 using a handheld device 40. The user can also verify and/or display the panel sequence and orientation via the handheld device 40.

Figure 7:
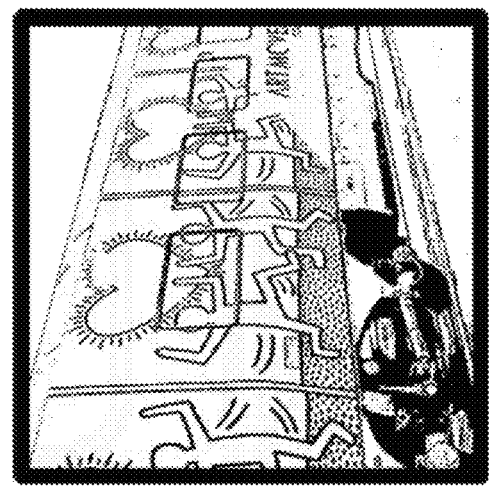
FIG. 7 shows a finished surface covered in panels.
Figure 6:
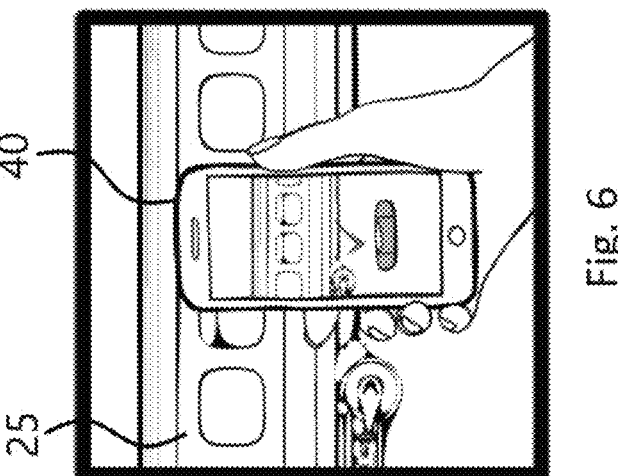
FIG. 6 shows a user scanning and preparing surface for application.

As shown in FIG. 6, the user scans a surface 25 to which the panels 10 are to be applied using the handheld device 40. As shown in FIG. 6, an exemplary surface can be the outer surface of a subway train car but is not limited to a train car and can be any surface as set forth above. The user can also confirm the accuracy of the panel installation using the handheld device 40. FIG. 7 shows an exemplary set of panels successfully applied to the surface.

What is claimed is:

1. A smart graphics panel system comprising:
a plurality of graphics panels, each graphics panel comprising:
an outer graphical image,
an inner substrate that affixes the graphics panel to a surface,
a concealed device embedded in the substrate, the device having a memory containing information relating to the graphics panel at least including a position indicator of the graphics panel in a composite image,
software that prepares and writes the information to the concealed device, and
a scanner that communicates with the concealed device to retrieve the information.

2. The smart graphics panel system of claim 1, wherein the surface is an outer surface of an automobile, a bus, a train car, a recreational vehicle (RV), a truck, a trailer, and combinations thereof.

3. The smart graphics panel system of claim 1, wherein information relating to the graphics panel comprises an art file name, a digital image file of the graphical image, a count of a total number of panels in a series, a serial number of the panel, a shipping address, a location where the product is to be installed, an orientation direction, and combinations thereof.

4. The smart graphics panel system of claim 1, wherein the scanner imposes, via augmented reality, virtual reality, or combination of both, an install diagram onto the surface, shows a user which panel is a first step in an installation process, shows an order of installation, provides feedback when alignment of panels is achieved, memorializes when a liner paper is removed from a panel, informs the user which panel is in which received box, compares contents of received boxes to a project to be done and notifies the user whether all the panels are present, informs the user what panels are remaining to be delivered, informs the user what panels are remaining to be installed, shows the user what panels goes into which box, and combinations thereof.

5. The smart graphics panel system of claim 1, wherein the software holds information about the graphic panel, instructs and directs the panel through a workflow lifecycle from factory, finishing, through packing, and installation at a final job site.

6. A smart panel system comprising:
a plurality of panels, each panel comprising:
an outer surface,
an inner substrate that affixes the panel to a surface,
an embedded device disposed in the substrate, the device having a memory containing information relating to the panel at least including a position indicator of the graphics panel in a composite image,
software that prepares and writes the information to the embedded device, and
a scanner that communicates with the embedded device to retrieve the information.

7. The smart panel system of claim 6, wherein the embedded device holds information about the panel, and is configured to instruct, via the scanner, the sequence of installing the plurality of panels.

8. The smart graphics panel system of claim 6, wherein information relating to the panel comprises a count of a total number of panels in a series, a serial number of the panel, a shipping address, a location where the product is to be installed, an orientation direction, and combinations thereof.

9. The smart graphics panel system of claim 6, wherein the embedded device includes an internet link to an e-commerce platform.

10. The smart graphics panel system of claim 6, wherein the panel is selected from decking, floor tile, a floorboard, laminate floor covering, laminate wall covering, a wall board, fabric wall covering, a portion of a mural, and combinations thereof.

* * * * *